(12) United States Patent
Lifson et al.

(10) Patent No.: US 7,854,140 B2
(45) Date of Patent: Dec. 21, 2010

(54) REHEAT DEHUMIDIFICATION SYSTEM IN VARIABLE SPEED APPLICATIONS

(75) Inventors: Alexander Lifson, Manlius, NY (US); Michael F. Taras, Fayetteville, NY (US)

(73) Assignee: Carrier Corporation, Syracuse, NY (US)

( * ) Notice: Subject to any disclaimer, the term of this patent is extended or adjusted under 35 U.S.C. 154(b) by 288 days.

(21) Appl. No.: 10/994,047

(22) Filed: Nov. 19, 2004

(65) Prior Publication Data

US 2006/0107685 A1    May 25, 2006

(51) Int. Cl.
 F25D 23/12    (2006.01)
(52) U.S. Cl. ............................. 62/259.2; 62/93; 62/183; 62/428
(58) Field of Classification Search ................... 62/428, 62/93, 259.2, 183, 419, 244
See application file for complete search history.

(56) References Cited

U.S. PATENT DOCUMENTS

| | | | |
|---|---|---|---|
| 3,410,405 A | 11/1968 | Marsteller | |
| 3,766,750 A * | 10/1973 | Aoh et al. | 62/259.1 |
| 5,086,626 A | 2/1992 | Iida | |
| 5,245,836 A | 9/1993 | Lorentzen et al. | |
| 5,255,529 A | 10/1993 | Powell et al. | |
| 5,490,394 A | 2/1996 | Marques et al. | |
| 5,568,732 A | 10/1996 | Isshiki et al. | |
| 5,613,369 A | 3/1997 | Sato et al. | |
| 5,642,628 A * | 7/1997 | Whipple et al. | 62/186 |
| 5,657,638 A | 8/1997 | Erdman et al. | |
| 5,694,783 A | 12/1997 | Bartlett | |
| 5,782,101 A | 7/1998 | Dennis | |
| 5,787,725 A * | 8/1998 | Shin | 62/443 |
| 5,797,276 A | 8/1998 | Howenstine et al. | |
| 6,073,457 A | 6/2000 | Kampf et al. | |
| 6,216,484 B1 * | 4/2001 | Yun | 62/325 |
| 6,397,610 B1 | 6/2002 | Weng et al. | |
| 6,415,617 B1 | 7/2002 | Seem | |
| 6,560,980 B2 | 5/2003 | Gustafson et al. | |
| 6,694,763 B2 | 2/2004 | Howard | |
| 6,929,452 B1 * | 8/2005 | Pargeter et al. | 416/186 R |
| 6,968,708 B2 * | 11/2005 | Gopalnarayanan et al. | 62/186 |
| 2001/0021116 A1 * | 9/2001 | Bruckmann et al. | 363/157 |
| 2001/0054293 A1 * | 12/2001 | Gustafson et al. | 62/183 |
| 2004/0074978 A1 * | 4/2004 | Rosen | 236/1 C |
| 2004/0244393 A1 * | 12/2004 | Lucas et al. | 62/186 |
| 2006/0075767 A1 * | 4/2006 | Lifson et al. | 62/196.3 |

* cited by examiner

*Primary Examiner*—Frantz F Jules
*Assistant Examiner*—Azim Rahim
(74) *Attorney, Agent, or Firm*—Carlson, Gaskey & Olds

(57) ABSTRACT

A refrigerant system is provided with a reheat function selectively utilizing the heat rejected by the variable speed drive controller and electronics that are often employed in known refrigerant cycles. By placing at least one of these variable speed drives in the path of air being delivered to an environment to be conditioned, the air is reheated to a desired temperature, after it has been overcooled in the evaporator to provide a desired humidity level. In this manner, the variable speed drive is cooled, and the reheat function is provided, without the requirement of any additional flow structure.

17 Claims, 1 Drawing Sheet

REHEAT DEHUMIDIFICATION SYSTEM IN VARIABLE SPEED APPLICATIONS

BACKGROUND OF THE INVENTION

This application relates to a refrigerant system having a reheat function utilizing variable speed drives as a source of heat.

Refrigerant systems are utilized in applications to change the temperature and humidity or otherwise condition the environment. In a conventional refrigerant system, a compressor delivers a compressed refrigerant to a heat exchanger, known as a condenser, which is typically located outdoors. From the condenser, the refrigerant passes through an expansion device, and then to an indoor heat exchanger known as an evaporator. In the evaporator, moisture may be removed from the air, and the temperature of air blown over the evaporator coil is reduced. From the evaporator, the refrigerant returns to the compressor. Of course, basic refrigerant systems are utilized in combination with many other optional features and in various design configurations.

In some cases, while the system is operating in a cooling mode, the temperature level of the indoor air stream to provide a comfort environment in a conditioned space may need to be higher than the temperature that would provide the ideal humidity level. On the other hand, lower the temperature of the air stream more moisture can be removed from the air. These contradicting trends presented challenges to refrigerant system designers. One way to address such challenges is to utilize various schematics incorporating reheat coils. In many cases, a reheat coil placed in the way of an indoor air stream downstream of the evaporator is employed for the purposes of reheating the air supplied to the conditioned space after it has been cooled in the evaporator, and where the moisture has been removed.

Known reheat systems require additional heat exchangers, flow control devices, piping, etc. Of course, it is typically beneficial to reduce a number of components, decrease refrigerant cycle and control logic complexity and consequently improve system reliability.

Variable speed drives that include dedicated inverters and power/control electronics are being incorporate more often into refrigerant systems. The inverters and power/control electronics generate heat that needs to be removed to improve efficiency and reliability of the electrical hardware. This wasted heat can be selectively utilized to improve comfort in the conditioned space

SUMMARY OF THE INVENTION

A refrigerant system is provided with at least one variable speed drive that typically generates a substantial amount of heat. As an example, a variable speed drive may be provided for the compressor and/or the evaporator fan. The major components of variable speed drives are typically inverters and power/control electronics (usually confined in the control boxes) that control the motors for the operation of compressors and fans at various speeds within a certain range.

In this invention, a variable speed drive is preferably placed in the path of air being delivered over the evaporator and to the environment to be conditioned. Thus, the variable speed drive is cooled by the air, and also provides heat for the reheat function. In this manner, the reheat function is provided without a requirement for any extra components and complexities associated with additional refrigerant flow structure and control logic. At the same time, the cooling of the variable speed drive is supplied without requiring a dedicated cooling circuit.

In one embodiment of this invention, a diverter structural member can be utilized to selectively reroute the airflow around the variable speed drive components when the reheat function is not desired or needs to be staged. For instance, such a diverter structural member may consist of a set of movable louvers or a simple diverter plate of an appropriate configuration.

These and other features of the present invention can be best understood from the following specification and drawings, the following of which is a brief description.

DETAILED DESCRIPTION OF THE PREFERRED EMBODIMENT

Figure 1:
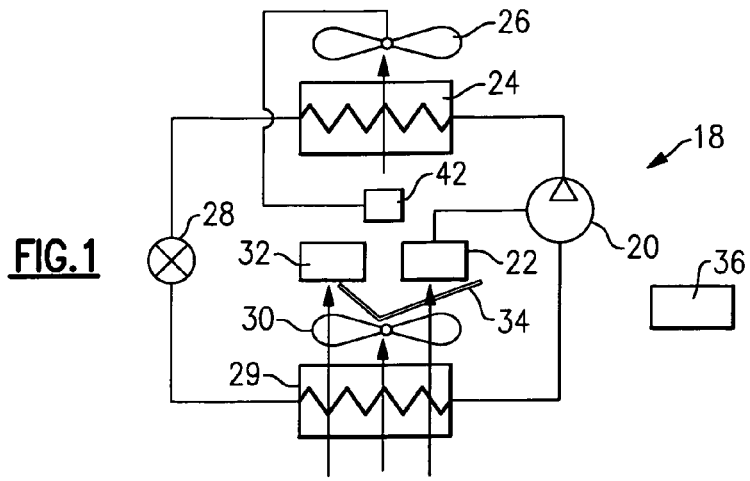
FIG. 1 shows a schematic of an inventive refrigerant system.

An inventive refrigerant system 18 is illustrated in FIG. 1 having a compressor 20 delivering a compressed refrigerant at a specific speed based upon a electrical signal provided by a variable speed drive 22, as known. The refrigerant passes downstream to a condenser 24, and an outdoor air-moving device such as fan 26 moves air over the condenser 24. An expansion device 28 is positioned downstream of the condenser, and an evaporator 29 is located downstream of the expansion device 28. As shown, an indoor air-moving device such as fan 30 moves air over the evaporator 29 and to an environment to be conditioned. A variable speed drive 32 is provided for the fan 30, again as known. A variable speed drive 42 can also be provided for the condenser fan 26.

When the air is cooled in the evaporator 29, the air is usually dehumidified as well. In some cases, to remove a required amount of moisture, the system is controlled such that the temperature of the air having passed over the evaporator is below the level that is desired by an occupant of the environment being conditioned. As well known, air having passed over the evaporator, and when reheat is occurring, over the variable speed drive, is directed into an environment to be conditioned, which is indoors. Further, as is well known, the fans 30 are indoors, as is the variable speed drive which is positioned in the path of the evaporator.

At least a portion of this air is passed over at least one of the variable speed drives 22, 32 and 42 such that the air is reheated to the desired temperature while preserving the reduced moisture content obtained in the evaporator 29. Also, cooling provided for the variable speed drives is potentially improving their reliability and efficiency. Further, no additional flow structure or dedicated system components are required, consequently reducing the system and control logic complexity and in turn improving overall system reliability.

An optional diverter system 34 is illustrated schematically for selectively diverting at least a portion of the air around one or several of the variable speed drives 22, 32 and 42. Thus, should the reheat function not be desired, the air can be diverted around the variable speed drives, such that the reheat function is not provided. Additionally, allowing the airflow over one or several variable speed drives, multiple stages of reheat can be provided. In the latter case, the diverter system 34 may have multiple positions. A control 36 is shown schematically, and would operate, as would be understood by a worker of ordinary skill this art, to achieve the various functions described above. Also, it is well understood that the diverter system 34 may be extremely simple (such as a diverter plate of a proper configuration) or more complicated (for instance, a set of movable louvers). The systems with various diverter constructions will equally benefit from the teachings of the invention, since the invention is transparent to such diverter constructions.

Figure 2:
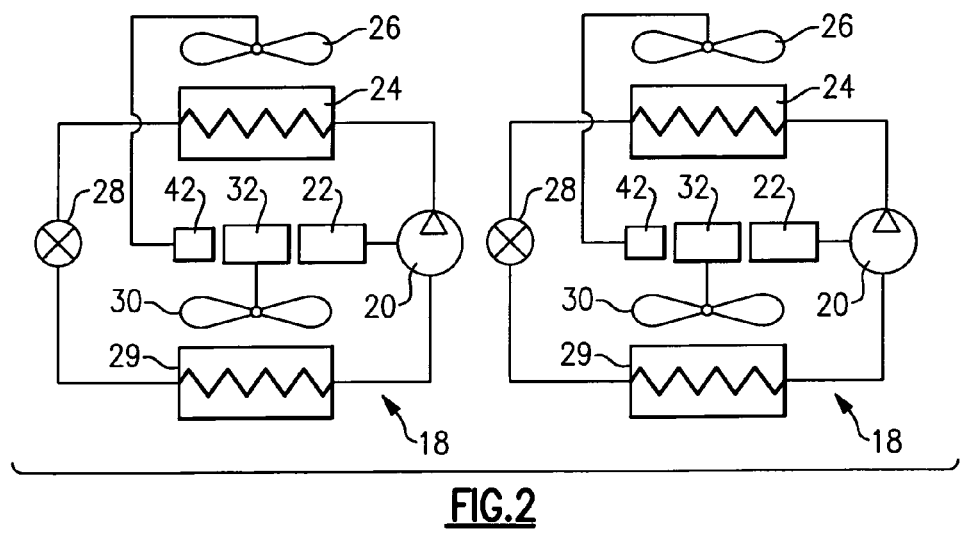
FIG. 2 shows an alternative schematic.
Figure 3:
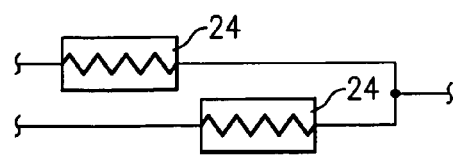
FIG. 3 shows an alternative schematic.
Figure 4:
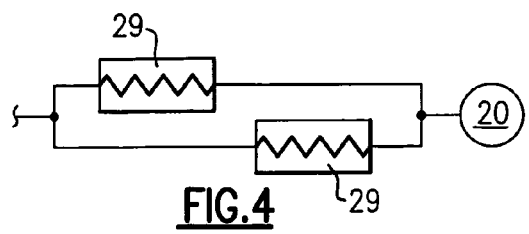
FIG. 4 shows an alternative schematic.
Figure 5:
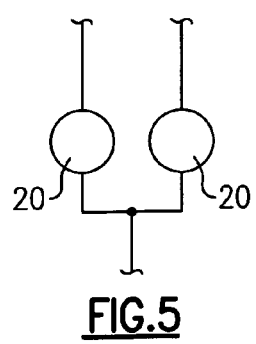
FIG. 5 shows an alternative schematic.

The system is shown in a very basic schematic. It should be well understood that various additional types of refrigerant system options can be incorporated in this invention. For example, the applicants has recently developed systems wherein the reheat function is utilized in heat pumps, with economizer cycles, compressor unloading schemes, and various other options. The schematic shown in FIG. 1 can also be extended to systems with multiple circuits (FIG. 2), or multiple condenser (FIG. 3), or multiple evaporator (FIG. 4), or multiple compressor (FIG. 5) arrangements, where at least one circuit or one of the evaporator or condenser fans have a variable speed drive that can be cooled by air passing over the evaporator coil.

Furthermore, it is well understood by a person of ordinary skill in the art that the reheat function provided by the variable speed drives may be utilized as an additional stage or stages of reheat and in combination with other conventional reheat approaches.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A refrigerant system comprising:
   a compressor,
   a condenser downstream of said compressor and an expansion device downstream of said condenser;
   an evaporator downstream of said expansion device,
   an air-moving device for moving air over said evaporator, and into an environment to be conditioned, and an air moving device for moving air over said condenser;
   at least one of said compressor and said air-moving devices having a variable speed drive, said variable speed drive being positioned in the path of air moved over said evaporator by said air-moving device, and downstream of said evaporator; and
   a diverter device for allowing at least a portion of air to be selectively diverted away from said variable speed drive.

2. The refrigerant system as set forth in claim 1, wherein the air moved over said evaporator is heated by the heat generated by said variable speed drive for the purpose of providing a unit reheat function.

3. The refrigerant system as set forth in claim 1, wherein the said condenser consists of multiple condensers.

4. The refrigerant system as set forth in claim 1, wherein the said evaporator consists of multiple evaporators.

5. The refrigerant system as set forth in claim 1, wherein the said compressor consists of multiple compressors.

6. The refrigerant system as set forth in claim 1, wherein the said refrigerant system consists of multiple refrigerant circuits.

7. The refrigerant system as set forth in claim 1, wherein both said compressor and at least one of said air-moving device have variable speed drives positioned in the path of air.

8. The refrigerant system as set forth in claim 1, further comprising a control for selectively operating said diverter when reheat of the air being delivered to an environment is not desired.

9. A method of operating a refrigerant system comprising the steps of:
   (1) providing a compressor, a condenser, an evaporator, and an air-moving device for passing air over said evaporator, and an air-moving device for passing air over said condenser and a variable speed drive for controlling at least one of said compressor and one of said air-moving devices;
   (2) placing said variable speed drive in a path of air being delivered by said air-moving device over said evaporator and into said environment, said variable speed drive providing a reheat function to selectively raise the temperature of air being delivered into the environment from a temperature to which it had been cooled in said evaporator; and
   (3) diverting at least a portion of air around said variable speed drive when reheat is not desired.

10. The refrigerant system as set forth in claim 1, wherein said air moving device for moving air over said evaporator being an indoor air moving device, moving air into an interior location.

11. The method of claim 9, wherein said air delivered by said air moving device over the evaporator and into the environment is delivered by an indoor air moving device, and into an indoor environment.

12. The refrigerant system as set forth in claim 1, wherein said environment to be conditioned is an indoor environment.

13. The refrigerant system as set forth in claim 1, wherein said variable speed drive is positioned indoors.

14. The refrigerant system as set forth in claim 1, wherein an occupant of the environment to be conditioned sets a desired temperature, and the path of air having moved over said evaporator is cooled to a level below said desired temperature, and then heated back toward said desired temperature by passing over said variable speed drive.

15. The method of claim 9, wherein said environment to be conditioned is an indoor environment.

16. The method of claim 9, wherein said variable speed drive is positioned indoors.

17. The method of claim 9, wherein an occupant of the environment to be conditioned sets a desired temperature, and the path of air having moved over said evaporator is cooled to a level below said desired temperature, and then heated back toward said desired temperature by passing over said variable speed drive.

* * * * *